Figures 1, 2:
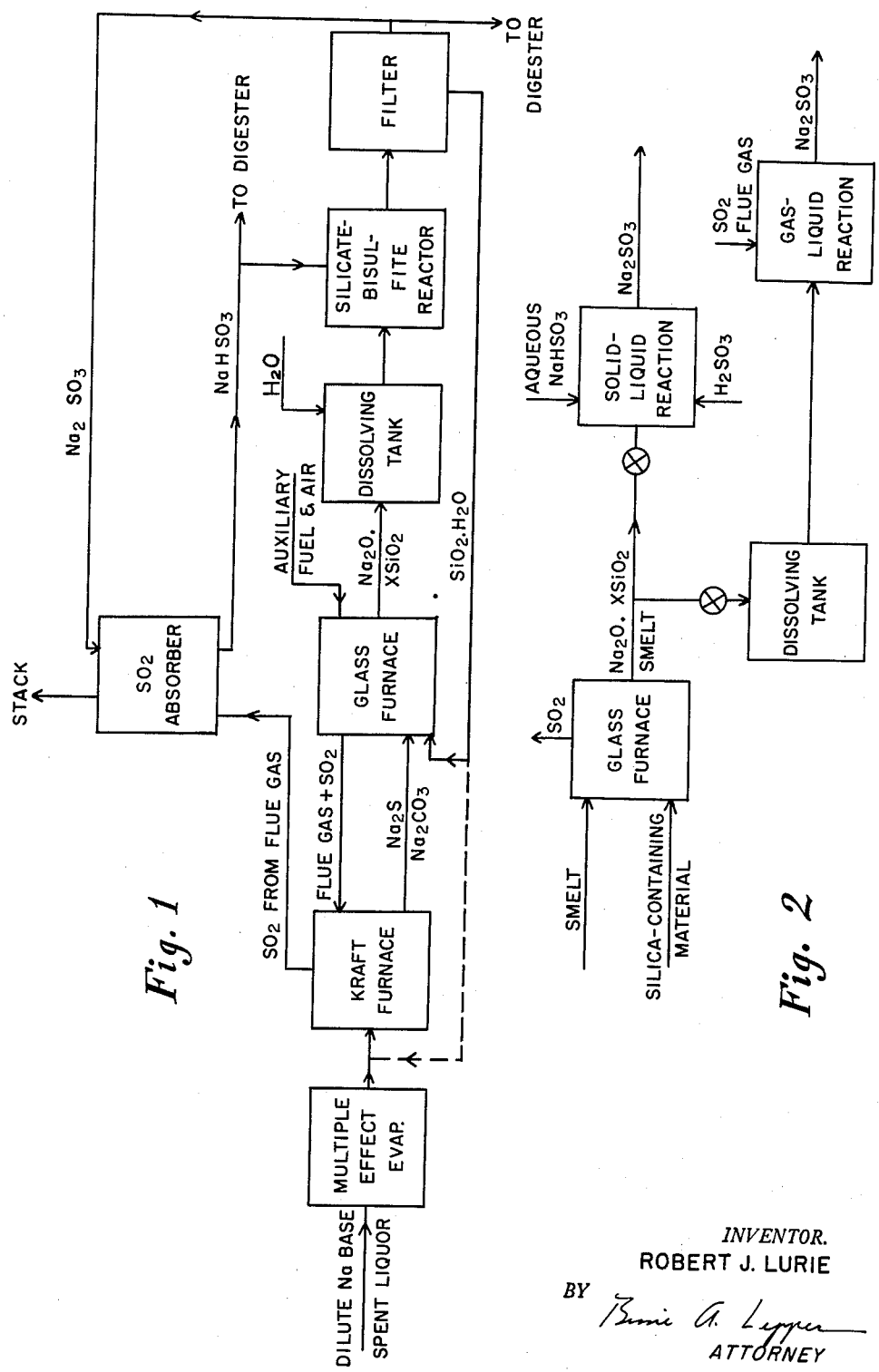

Oct. 30, 1962  R. J. LURIE  3,061,408
RECOVERY OF CHEMICALS FROM WASTE LIQUORS
Filed May 5, 1960

INVENTOR.
ROBERT J. LURIE
BY
ATTORNEY

United States Patent Office 3,061,408
Patented Oct. 30, 1962

3,061,408
RECOVERY OF CHEMICALS FROM WASTE LIQUORS
Robert J. Lurie, South Acton, Mass., assignor to Arthur D. Little, Inc., Cambridge, Mass., a corporation of Massachusetts
Filed May 5, 1960, Ser. No. 27,213
16 Claims. (Cl. 23—48)

This invention relates to the manufacture of pulp and more particularly to a method and apparatus for the recovery of chemicals from the waste liquor resulting from pulp production.

In preparing pulp from lignocellulosic-containing materials such as wood, straw and the like, it is customary to digest or chemically react the lignocellulosic materials to soften or remove from the cellulosic materials components such as lignin and the like which tend to bind the cellulose fibers together. Subsequent to the removal of these components the fibers may be further treated such as by mechanical disintegration to render them suitable for future use such as in paper making. One of the well known digesting treatments to remove these cellulosic binding components consists of exposing the lignocellulosic-containing materials to sodium sulfite, sodium bisulfite, or sodium bisulfite with free $SO_2$ either together or separately in one or more stages of digestion.

The treatment of cellulosic materials with sulfites and bisulfites is known, the calcium compounds being fairly commonly used. The sodium sulfites and bisulfites are however preferred, but they are more expensive and it is therefore desirable, in conjunction with their use, to have a method for recovering them in usable chemical form from the dilute liquors after cellulose treatment. It would, therefore, be convenient to have an inexpensive and efficient way of recovering the chemical treating materials so that they might be recycled in the digestion process.

Several methods for recovering sodium sulfite and bisulfite are known in the art. Each begins with concentrating the dilute spent liquor and then burning the resulting concentrate liquor to form a smelt which is primarily sodium carbonate and sodium sulfide. It will be appreciated then that the primary object of any recovery process is to convert the sodium sulfide in the smelt to sodium sulfite. In the burning, $SO_2$ gas is also formed as part of the flue gas, and it is available as a reactant in the recovery process.

One approach is to oxidize this sodium sulfide to sodium sulfite directly with air. This technique has not proven satisfactory, however, because sodium thiosulfate and sodium sulfate are invariably formed along with sodium sulfite. The presence of sodium thiosulfate in sulfite cooking liquors is well known to be deleterious to pulp quality, resulting in dark, hard-to-bleach pulps. Sodium sulfate, while not deleterious to sulfite pulping, represents a dead load of costly chemicals since in this form sodium and sulfur are not active pulping reagents.

A second approach to sodium-base sulfite spent liquor recovery involves separating the sodium carbonate from the sodium sulfide in the smelt and using it to absorb the $SO_2$ in the flue gas and form sodium sulfite or sodium bisulfite. This may be done by taking advantage of the fact that sodium carbonate is less soluble in water than sodium sulfide. Smelt separation can thus be conducted by fractional crystallization of a solution of the smelt. The sodium carbonate crystals are then separated from the mother liquor, dissolved in water, and used to absorb the $SO_2$ in the furnace flue gases to form sodium sulfite or sodium bisulfite cooking liquors. The mother liquor which remains after the sodium carbonate crystals have been filtered off consists of a water solution of sodium sulfide that is saturated with respect to sodium carbonate. The solution is returned to the recovery furnace where, with continued recycle, it is ultimately converted to sodium carbonate and $SO_2$. A basic disadvantage of the smelt separation technique for spent liquor recovery is that for every pound of sodium sulfide that is recycled to the recovery furnace approximately three pounds of water are also recycled. Because this water must be evaporated in the furnace with no possibility for recovering the heat necessary to evaporate it, the recycle step leads to a decrease in the amount of process steam that the recovery boiler can produce.

A third basic approach to the recovery of sodium and sulfur from spent sulfite liquor involves the indirect oxidation of the smelt sodium sulfide. This may be accomplished by stripping $H_2S$ from a solution of the furnace smelt. Since $H_2S$ is a weak acid gas, it may be evolved from the smelt solution by contacting the solution with any acid stronger than $H_2S$. Carbon dioxide, $SO_2$, sodium bisulfite, organic acids, such as oleic acid, and ion exchange resins in acid form are sufficiently acid to react with the smelt to evolve $H_2S$ from the smelt solution. The $H_2S$ thus evolved can be burned to $SO_2$ which in turn can then be combined with the acidified smelt solution to form sodium sulfite or sodium bisulfite cooking liquor.

A common disadvantage of this third recovery technique is that it leads to the problem of handling large quantities of $H_2S$ which is a highly toxic, explosive and obnoxious gas. One of the reasons for undertaking sulfite recovery, along with the primary reason of achieving an economical process, is to eliminate the water pollution problem associated with sewering spent sulfite liquor. The recovery processes which involve $H_2S$ evolution solve the problem of water pollution at the expense of creating a hazard of air pollution.

It would therefore be desirable to have available a process and apparatus for recovering the sodium and sulfur in spent sulfite liquors in an economical manner which at the same time would not introduce other problems such as toxicity control, possible stream pollution and the like. In accordance with this invention it has been found that such a recovery system may be realized by adding to the spent liquor a reactant rich in available silica or alumina and essentially free from alkaline earth oxides which will react in the manner described below to recover the sodium as sodium silicate, sodium aluminate or a mixture of these which is then reacted with $SO_2$ or a bisulfite to form sodium sulfite for further pulp digestion.

It is therefore a principal object of this invention to provide a method for economically and efficiently recovering sodium and sulfur from the spent liquors of a cellulosic digestion reaction. It is another object to recover sodium and sulfur in a chemical form suitable for recycling in the digestion process. Yet another object is to provide a high quality cooking liquor essentially free of thiosulfates.

It is another object to provide a method of the character described which is straightforward and conveniently carried out. It is still another object of this invention to provide such a method as described which does not produce as by-products any toxic materials or undesirable components which would be capable of polluting near-by streams or be otherwise difficult or undesirable to handle.

It is another object of this invention to provide apparatus suitable for the recovery of sodium and sulfur in the form of sodium sulfite to be recycled in the cellulosic digestion process. These and other objects will become apparent in the following description of this invention.

For a better understanding of the process and apparatus of this invention, reference is made to the accompanying drawings in which FIG. 1 represents a flow diagram of the general process of this invention; and FIG. 2 is a flow diagram of a modification of a portion of the process of this invention.

The spent liquors from sodium sulfite pulping of lignocellulosic-containing materials are essentially dilute solutions of sodium ligno sulfonate. These may generally be represented as R—$SO_3Na$ in which R is primarily lignin. This liquor may also contain other organic matter such as sugars, organic acids, and salts of organic acids.

In processing the spent liquors it is customary first to concentrate the liquor by removing a considerable amount of the water and then burn the concentrated material in a recovery furnace, generally in a so-called kraft-type furnace. This burning in the furnace serves to combust the organic portion of the liquor converting a good part of it to volatile material and to form a melt of the inorganic material which is primarily sodium sulfide and sodium carbonate together with a small amount of sodium sulfate, sodium thiosulfate and sodium sulfite.

The molecular ratio of sodium sulfide to sodium carbonate in this smelt may range between 45/55 and 75/25, depending on the ratio of sodium to sulfur that was present in the spent liquor prior to burning. The flue gases which leave the furnace contain dilute $SO_2$ gas in a concentration equivalent to about 0.4 to 1% by dry volume of the flue gas.

In the prior art in the burning or smelting step, the sodium is converted to sodium sulfide which in turn must then be reacted to form sodium sulfite by one of the three routes described above. By the process of this invention the formation of sodium sulfide as a final product in the burning process is avoided or prevented. This is accomplished by furnishing an additional reactant, i.e., one which will combine with the sodium to prevent the ultimate formation of sodium sulfide. The reactant of this invention is a material which is rich in silica, alumina or a combination of these, and which reacts with the sodium to form sodium silicates, aluminates or a mixture of these as a final combustion product. The formation of these intermediates in turn eliminates the subsequent oxidizing reactions required in the prior art to convert sodium sulfide to sodium bisulfite, for by the process of this invention no substantial quantity of sodium sulfide remains after the smelt has been converted to sodium silicate or aluminate.

The reactants which are suitable for the practice of this invention may be defined as any of those which are rich in silica such as sand, quartzite, and the like; rich in alumina such as refined bauxite; or which contains both silica and alumina such as feldspar, kaolin and the like. Of course, pure silica or alumina can also be used. These reactants, should not contain any appreciable quantities of the alkaline earth oxides for these would form an insoluble glass-like composition with the sodium and silica.

The quantity of reactant added will, of course, depend upon the amount of sodium ions present and it may generally be defined as at least that amount required to convert all of the sodium to sodium silicate or sodium aluminate as indicated below in the discussion on the chemical reactions involved in the process.

At high temperatures, silica or a siliceous material exhibits the properties of a strong acid while at low temperatures silicate salts behave as salts of a weak acid. Thus, at high temperatures silica will liberate $SO_2$ from sodium sulfate or under oxidizing conditions will liberate $SO_2$ from sodium sulfide.

$$Na_2SO_4 + xSiO_2 \rightarrow Na_2O.xSiO_2 + (SO_3) \quad (1)$$
$$(SO_3) \rightarrow SO_2 + \tfrac{1}{2}O_2 \quad (2)$$
$$Na_2S + xSiO_2 + \tfrac{3}{2}O_2 \rightarrow Na_2O.xSiO_2 + SO_2 \quad (3)$$

Thus it will be seen that in the burning of the concentrated spent liquor the primary solid product is sodium silicate which is converted to sodium sulfite as described below.

At low temperatures, on the other hand, sodium silicate has the properties of a salt of a weak acid and it will react with $SO_2$ or with sodium bisulfite to precipitate silica.

$$Na_2O.xSiO_2 + SO_2 \rightarrow Na_2SO_3 + xSiO_2 \quad (4)$$
$$Na_2O.xSiO_2 + 2NaHSO_3 \rightarrow 2Na_2SO_3 + xSiO_2 + H_2O \quad (5)$$

Likewise, alumina or alumina containing materials will, at elevated temperatures, liberate $SO_2$ from sodium sulfide under oxidizing conditions, or from sodium sulfate under reducing conditions, and will form sodium aluminate, generally represented as $Na_2O.xAl_2O_3$. In similar fashion the sodium aluminate will react with $SO_2$ at low temperature to form $Na_2SO_3$ and $Al_2O_3$ as $SiO_2$ is formed in Equation 4 above.

In the practice of this invention the reaction products (amorphous hydrated silica, alumina, or combination of these) that remain as solid products when the sodium silicate, aluminum silicate or mixed silicate is acidified may be withdrawn from the process as a by-product or recycled in the process for reaction with additional quantities of spent liquor.

Turning now to FIG. 1, the process of this invention may be so described with reference to its application to a typical recovery system. In the following description the material added will be assumed to be a silica-rich additive. However, it should be understood that a material rich in alumina would be equally well suited. This example is therefore meant to be illustrative and not limiting.

The dilute sodium spent liquor is first introduced into a multiple-effect evaporator where the total quantity of liquid is reduced to give a concentrated liquor containing from about 50 to 60% solids by weight. The siliceous material which is to be used as the reactant to tie up the sodium ions may be mixed with the concentrated spent sulfite liquor coming from the multiple-effect evaporator and fed with it directly to the kraft furnace. Under some circumstances, however, the residence time and the oxygen concentration in the typical kraft furnace may not be adequate to complete the necessary reactions to form sodium silicate as required in this invention. It will be seen that there is therefore provided in FIG. 1 what is designated as a glass furnace in which the smelt from the kraft furnace is reacted along with an additional amount of the siliceous material. If the siliceous material has not been added to the kraft furnace then the reaction to form the sodium silicates required in this invention will take place exclusively in the glass furnace. Thus it is within the scope of this invention to add the siliceous material either to the kraft furnace, to the glass furnace or to both. The residence time and the oxidizing conditions in the glass furnace are so controlled as to convert substantially all of the sodium to sodium silicates, thus bringing Reaction 3 substantially to completion. The gases from the glass furnace may be returned to the oxidizing zone of the kraft furnace so that substantially all of the heat energy and any $SO_2$ formed can be recovered. As in the case of the prior art process, the $SO_2$ in the flue gas from the kraft furnace is passed through an $SO_2$ absorber, conveniently by countercurrent contact with sodium sulfite to form sodium bisulfite.

The sodium silicates from the glass furnace or from the kraft furnace, if no glass furnace is used, are first dissolved in water in a dissolving tank. The resulting aqueous solution is then transferred to a silicate-bisulfite reactor into which sodium bisulfite is introduced. In the process of FIG. 1, the sodium bisulfite is that which has been formed in the $SO_2$ absorber. In this reactor the siliceous material originally introduced is recovered and sodium sulfite is formed. The reaction products are then filtered to remove the siliceous material and the sodium sulfite is available to be returned to the digester with a small amount of it being used in the SO₂ absorber. The siliceous material, on the other hand, may be recovered and returned as the additive to be introduced into the kraft or glass furnace. Thus, it will be seen that the process in FIG. 1 offers a reaction cycle which permits rapid, inexpensive recovery of the sulfites and at the same time offers a series of reactions which permits the additive to be constantly reused. Moreover, the disadvantages associated with the formation of Na₂S and H₂S are avoided.

The process of this invention may be modified as is illustrated in FIG. 2. In this figure two modifications are shown; one of them indicating that the sodium silicate smelt from the furnace may be reacted directly with aqueous sodium bisulfite or sulfurous acid in a solid-liquid reaction. Alternatively the sodium silicate may be dissolved and reacted with the furnace flue gases in a gas-liquid reaction. However, the process illustrated in FIG. 1 is preferred because the leaching required in the alternative steps of FIG. 2 may lead to incomplete recovery of the sodium from the solid sodium silicate. Finally since direct acidification of sodium silicate solutions by SO₂, as required in these modifications, may cause the sodium silicate solution to gel, care must be taken to avoid the difficulties associated with separating the precipitated hydrated silica. It should be noted, however, that incomplete extraction of alkali from the precipitated alkali silicate or aluminate results in no loss of alkali from the process inasmuch as the unreacted alkali will be recirculated with the silica or alumina if the process is a cyclic one.

It will be seen from the description of this invention and from FIGS. 1 and 2 that the silica is always precipitated in an acid medium. This in turn means that no appreciable soluble silicates would be formed to be returned to the digester. Thus there is no danger of building up silicate deposits in the boilers or evaporators.

It will be seen from the above description of this invention that there is provided an effective process for the recovery of sodium and sulfur from spent liquors by controlling the formation of sodium sulfide and hence eliminating the usual process steps required to recover this material in a useful form. There is provided a way of chemical recovery that does not involve the formation of any toxic or obnoxious materials or which does not require the use of expensive reactants. By using in the process of this invention an inexpensive material, a simple, cheap method of recovering spent liquors is disclosed, thus making it possible to use the preferred sodium sulfites in treating cellulosic materials.

A preferred embodiment of this invention is the use of feldspar as the additive material. Feldspar is a naturally occurring inexpensive mineral rich in sodium or potassium alumino silicate from which the sodium oxide or potassium oxide is made available for recirculating to make up at least some of the losses which occur in the cooking and recovery process.

I claim:

1. Process for recovering the sodium and sulfur components from sodium-base sulfite spent liquors resulting from chemical digestion of a lignocellulose-containing material, comprising the steps of concentrating said spent liquors and combusting the resulting concentrated liquors, said combusting step being carried out in the presence of an additive selected from the group consisting of silica-rich and alumina-rich materials to react said additive with said sodium, and subsequently converting the resulting sodium reaction products to sodium sulfites in the presence of an acidic reactant selected from the group consisting of SO₂, H₂SO₃ and NaHSO₃, said additive having as its essential reacting component with respect to said sodium an oxide selected from the group consisting of SiO₂ and Al₂O₃.

2. Process in accordance with claim 1 wherein said additive is feldspar.

3. Process in accordance with claim 1 wherein said additive is sand.

4. Process in accordance with claim 1 wherein said additive is alumina.

5. Process for recovering the sodium and sulfur components from sodium-base sulfite spent liquors resulting from chemical digestion of a lignocellulose-containing material, comprising the steps of concentrating said spent liquors, combusting the resulting concentrated liquors in the presence of an additive selected from the group consisting of silica-rich and alumina-rich materials thereby to react said additive with sodium to form a sodium complex and SO₂ gas, and reacting said sodium complex with an acid reactant to form sodium sulfites, said additive having as its essential reacting component with respect to said sodium an oxide selected from the group consisting of SiO₂ and Al₂O₃.

6. Process in accordance with claim 5 wherein said SO₂ gas is used as the acid reactant to form said sodium sulfites.

7. Process in accordance with claim 5 wherein said combusting step is accomplished in a kraft-type furnace.

8. Process in accordance with claim 5 wherein said combusting step is accomplished in a glass furnace.

9. Process in accordance with claim 5 wherein said combusting step is accomplished partially in a kraft-type furnace and partially in a glass furnace.

10. Process for recovering the sodium and sulfur components from sodium-base sulfite spent liquors resulting from chemical digestion of a lignocellulose-containing material, comprising the steps of concentrating said spent liquors, combusting the resulting concentrated liquors in the presence of an additive containing SiO₂ as its essential reacting component with respect to said sodium thereby to form sodium silicates and SO₂, absorbing said SO₂ in a sodium sulfite solution thereby to form sodium bisulfite, and reacting said sodium silicates with said sodium bisulfite thereby to form sodium sulfites.

11. Process for recovering the sodium and sulfur components from sodium-base sulfite spent liquors resulting from chemical digestion of a lignocellulose-containing material, comprising the steps of concentrating said spent liquors, combusting the resulting concentrated liquors in the presence of an additive containing SiO₂ as its essential reacting component with respect to said sodium thereby to form sodium silicates and SO₂, reacting said sodium silicates with an acidic reactant selected from the group consisting of SO₂, H₂SO₃, NaHSO₃ and mixtures thereof thereby to form sodium sulfites and hydrated silica, and separating said sodium sulfite and said hydrated silica.

12. Process in accordance with claim 11 wherein said additive is feldspar.

13. Process for recovering the sodium and sulfur components from sodium-base sulfite spent liquors resulting from chemical digestion of a lignocellulose-containing material, comprising the steps of concentrating said spent liquors, combusting the resulting concentrated liquors in a kraft-type furnace thereby to form SO₂ gas and a smelt consisting primarily of sodium sulfide and sodium carbonate, reacting said smelt at elevated temperatures with a sufficient quantity of an additive containing SiO₂ as its essential reacting component with respect to said sodium thereby to convert substantially all of said sodium sulfide and sodium carbonate to sodium silicates, and reacting said sodium silicates with an acidic reactant selected from the group consisting of SO₂, H₂SO₃, NaHSO₃ and mixtures thereof thereby to form sodium sulfite for further digestion of lignocellulose-containing materials.

14. Process in accordance with claim 13 wherein said step of reacting said sodium silicates with an acidic reactant is carried out as a liquid-liquid reaction, said sodium silicates having been dissolved in water prior to said reacting.

15. Process in accordance with claim 13 wherein said step of reacting said sodium silicates with an acidic reactant is carried out in a solid-liquid reaction.

16. Process in accordance with claim 13 wherein said step of reacting said sodium silicates with an acidic reactant is carried out between said sodium silicates dissolved in water and $SO_2$ gas resulting from said combusting step.

References Cited in the file of this patent

UNITED STATES PATENTS

| | | |
|---|---|---|
| 1,702,586 | Bradley | Feb. 19, 1929 |
| 1,821,138 | Bradley | Sept. 1, 1931 |
| 2,801,900 | Benning | Aug. 6, 1957 |

OTHER REFERENCES

Merrill: "Journal of Chemical Education," vol. 24, No. 6, June 1947, pages 262–263.